(12) United States Patent
Lee et al.

(10) Patent No.: US 9,959,077 B2
(45) Date of Patent: May 1, 2018

(54) DATA RANDOMIZATION FOR FLASH MEMORY

(71) Applicant: Tidal Systems, Inc., Santa Clara, CA (US)

(72) Inventors: Meng Kun Lee, Cupertino, CA (US); Priyanka Thakore, San Jose, CA (US)

(73) Assignee: Tidal Systems, Inc., Santa Clara, CA (US)

( * ) Notice: Subject to any disclaimer, the term of this patent is extended or adjusted under 35 U.S.C. 154(b) by 676 days.

(21) Appl. No.: 14/546,997

(22) Filed: Nov. 18, 2014

(65) Prior Publication Data

US 2016/0139827 A1    May 19, 2016

(51) Int. Cl.
*G06F 3/06* (2006.01)
*G06F 21/00* (2013.01)

(52) U.S. Cl.
CPC .......... *G06F 3/0679* (2013.01); *G06F 3/064* (2013.01); *G06F 3/0623* (2013.01); *G06F 3/0689* (2013.01); *G06F 21/00* (2013.01)

(58) Field of Classification Search
None
See application file for complete search history.

(56) References Cited

U.S. PATENT DOCUMENTS

2012/0239861 A1*  9/2012  Lee .................... G11C 11/5628
                                                              711/103

* cited by examiner

*Primary Examiner* — Midys Rojas
(74) *Attorney, Agent, or Firm* — Brooks, Cameron & Huebsch, PLLC

(57) ABSTRACT

Data words written to an SSD device, or other device or output data stream, may be randomized using a seed based on physical addressing information, such as a page address, column address, and a cycle count for the page address. This enables the storage and de-randomization of variable length data blocks stored at random locations within a page without requiring storage of additional data, which would make recovery impossible if lost in prior approaches. The page address, column address, and block address are physical attributes of the storage location for the data word and do not need to be saved and therefore will not be lost making recovery of the seed always possible. The cycle count can be saved and, if lost, limited trials with range of cycle counts can be exercised to de-randomize the data word and decoding may be used to determine whether descrambling was successful.

20 Claims, 5 Drawing Sheets

DATA RANDOMIZATION FOR FLASH MEMORY

BACKGROUND

This invention relates to systems and methods for randomizing data for nand Flash reducing burn-in in a flash memory system and improving noise characteristics for a given nand flash device as specified by a vendor.

BACKGROUND OF THE INVENTION

In many nand flash devices, a data scrambler is needed in order to randomize the data content written in nand cells. The main goal for the data scrambler is to achieve data randomness in three different aspects:
  (a) Data within a bit string is random. This means the voltage distribution within a physical page is about even.
  (b) Data on neighboring pages (1 or more pages apart) are random, i.e. voltage level on the same column bits on the two pages are uniformly distributed across the block.
  (c) Temporal randomness i.e. same host data written on the same page at two different times is random (to avoid burn ins).

To elaborate more on (a), there are four levels of voltage distribution in MLC (multi-level cell) NAND as shown below, and there should be roughly 25% of cells for each of the four voltage levels. Similarly, there are 8 voltage levels in TLC NAND and there should be roughly 12.5% cells in each of the voltage level. For (b), the same column bit in the entire block should be evenly distributed For (c), data content being programmed to non-volatile memory should be random from one program cycle to another for each of the cell within a physical page. For example, a MLC cell #N should be written with random voltage level between level 0 to level 3 on program #1, #2, #3 and across the life cycle of the cell.

Typical data scrambling uses the concept of feedback like PRBS (pseudorandom binary sequence) where the next scrambled data is a function of previous data and current scrambler content). This means that to descramble Nth data in the LBA, one needs to descramble all the N−1 Previous data successfully. This indirectly means one needs to know the start see of the LBA (logical block address), which typically includes the start index or LBA number provided by system firmware. When data is read from the non-volatile device, the same seed is provided by the system firmware to de-scramble the data content. This introduces the requirement that the seed has to be known by firmware. If the seed is lost, the data will not be de-scrambled correctly and hence data is considered irrecoverable. The seed is usually provided per page, or per LBA base.

One general characteristic of the data scrambler is that one seed is provided for a page or LBA, and this is, in general, sufficient to meet the requirement for data randomization for a page, or multiple LBAs within a physical page. In modern applications, an LBA is usually a unit for data access. Most reads read out just the LBA. While using LBA based randomization, data for specific LBA can be read out using the known LBA seed by system firmware without reading out the entire page (note that a LBA is usually a smaller unit than a whole page) in order to save the read data transfer time from the NAND. This is assuming that the LBA is known to the firmware, so that the seed can be provided correctly to descramble the specific LBA data.

The apparatus and methods disclosed herein provide an improved apparatus and method for data randomization.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
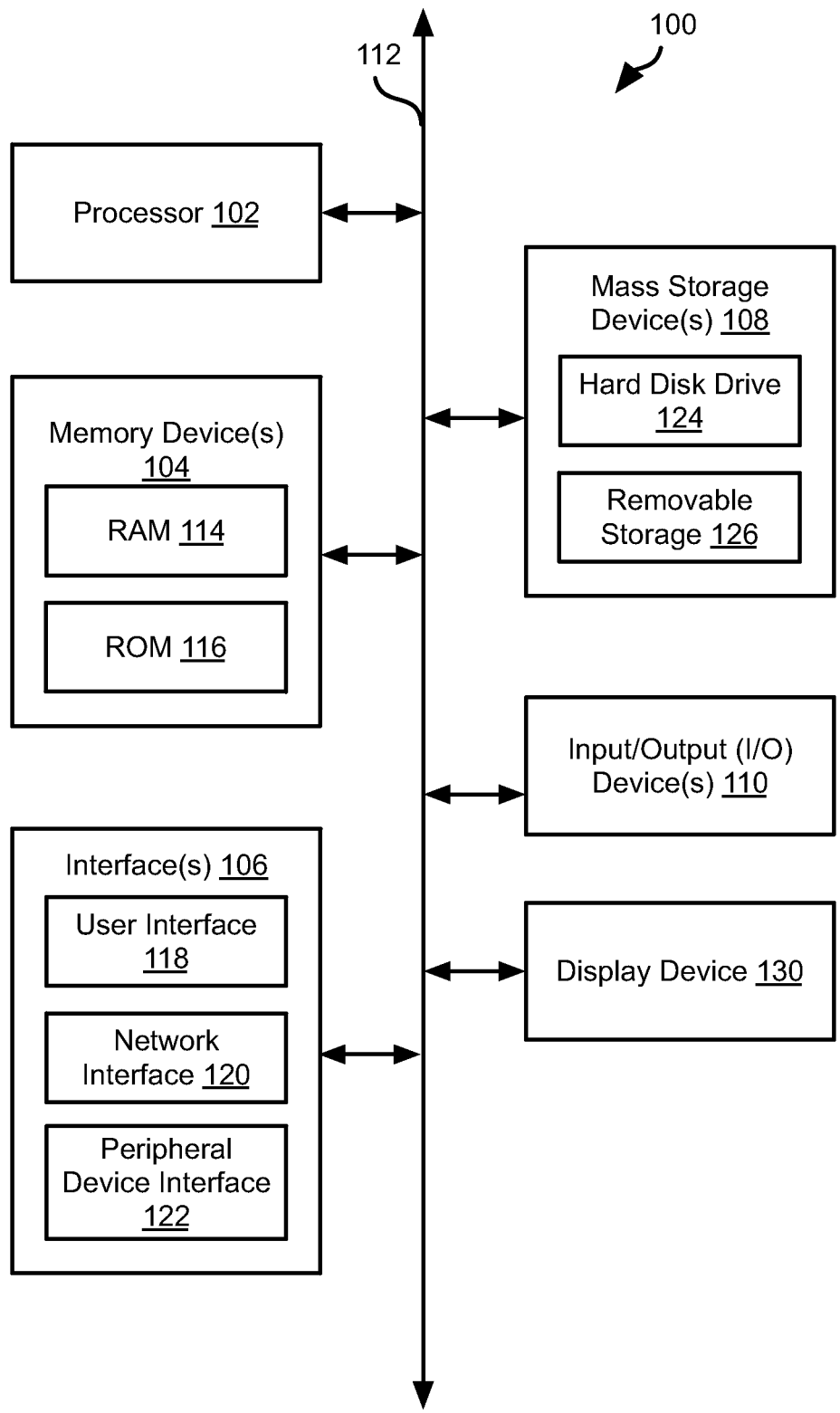
FIG. 1 is a schematic block diagram of a computing system suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, the invention has been developed to provide apparatus and methods for storing and accessing data in a flash memory. In particular, the disclosed embodiment removes the requirement for feedback of previous approaches and uses only current physical information of a device and no data dependency. In particular, the disclosed implementation make adjacent bytes/bits random enough and satisfy the requirements of (a), (b), and (c). The disclose implementation overcomes the limitations of the above-described conventional approach, which is seeded with random number, or with a page location within a block and/or other logical information, such as a LBA (logical block address).

In particular, the disclosed implementation the LBA number and the LBA location is not needed and data may be recovered if the LBA is lost. If the seed itself is lost then the SEED may be recovered through limited trials of data descrambling. In particular, one exemplary implementation advantageously:
  (1) Enables descrambling content without knowing LBA number and LBA start location in the physical space.

(2) Allows descrambling of the specific physical location without having the need to read out data in an adjacent physical locations. This indirectly means to read out data for a specific LBA, one does not need to read out more than one LBA to descramble that specific LBA.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as flash memory.

Mass storage device(s) 108 include various computer readable media, such as magnetic tapes, magnetic disks, optical disks, solid-state memory (e.g., flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet.

Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
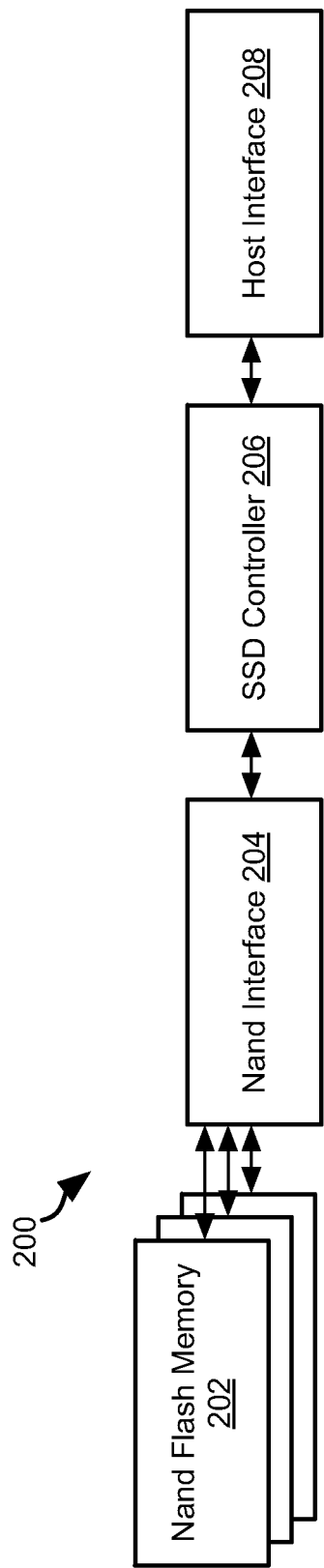
FIG. 2 is a schematic block diagram of a components of a storage system in accordance with the prior art.

Referring to FIG. 2, in some embodiments, a system 200 including an SSD 200 may include a plurality of nand flash memory devices 202. Nand flash memory devices 202 may be single level cell (SLC), two level cell (MLC), three level cell (TLC), or some other type of nand flash device. One or more nand devices 202 may interface with a nand interface 204 that interacts with an SSD controller 206. The SSD controller 206 may receive read and write instructions from a host interface 208 implemented on or for a host device, such as a device including some or all of the attributes of the computing device 100. The host interface 208 may be a data bus, memory controller, or other components of an input/output system of a computing device.

The systems and methods disclosed herein may be implemented by an SSD controller 206 interposed between the host interface 208 and the nand interface 204. In other embodiments, the nand interface 204 may implement some or all of the functionality disclosed therein. In still other embodiments, an additional component may be interposed between a conventional nand interface 204 and SSD controller 206 in order to implement all or part of the functions disclosed herein.

Figure 3A:
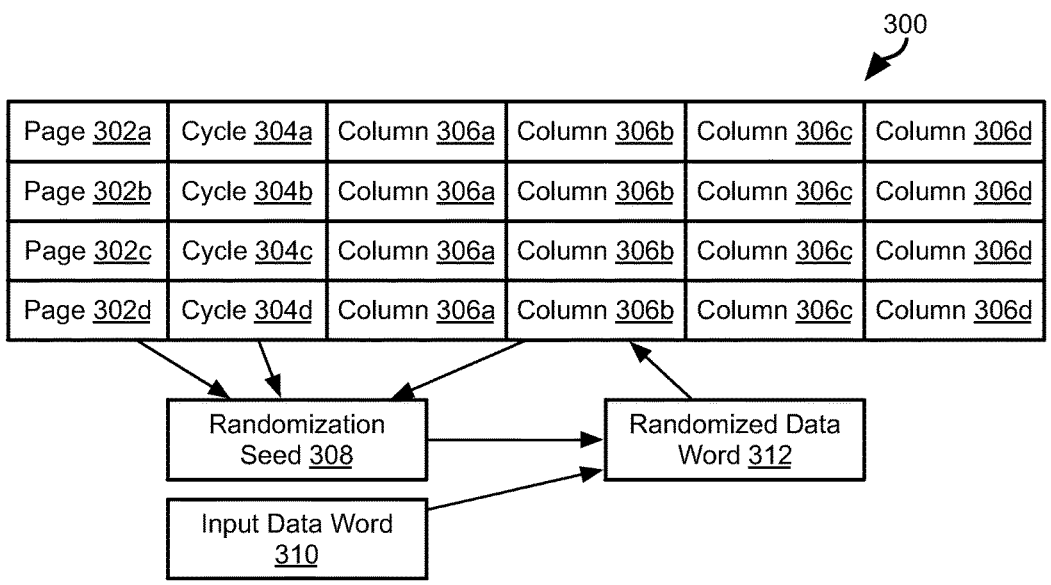
FIGS. 3A and 3B are schematic block diagrams illustrating data randomization and de-randomization processes in accordance with an embodiment of the invention.
Figure 3B:
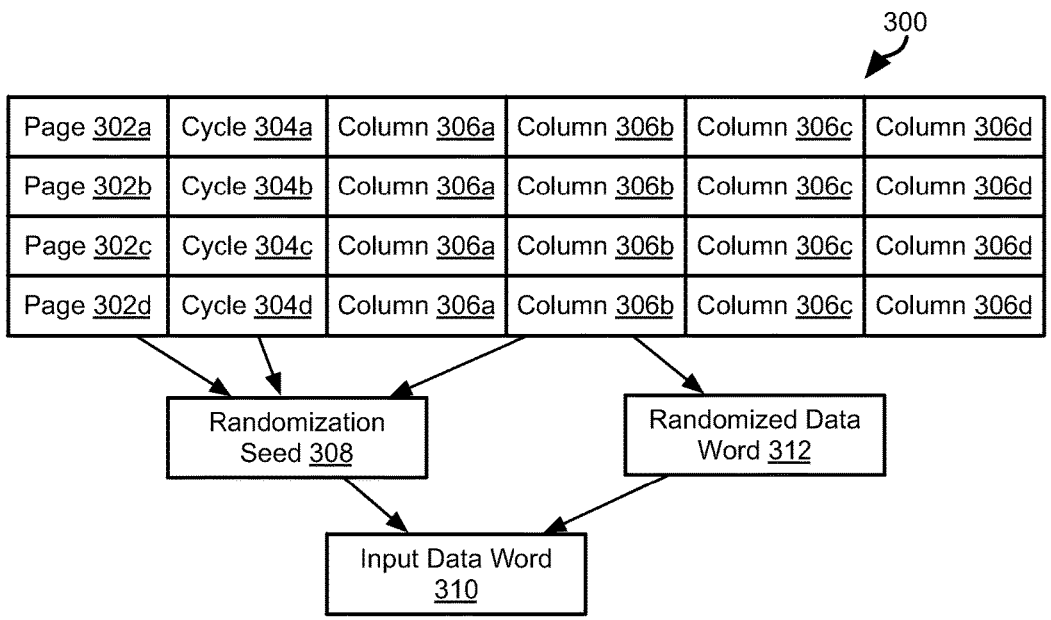

Referring to FIGS. 3A and 3B, in some implementations as the starting point of a logical block of data words (a "logical block address" of LBA) may be different and requires processing to obtain, using an identifier of an LBA as part of the random seed may be impractical when performing data scrambling, also referred to herein as randomization.

As noted above, in prior approaches anytime a physical page is used to save different groups of data, e.g., one LBA is one group, a second LBA is second group, and meta data may be stored separately in a different group. When this occurs for firmware to descramble the content it needs (a) the exact start address of the group to descramble, (b) any data content within the group (as scrambling/descrambling is data dependant), (c) and in cases where a seed includes this group information, e.g. a seed includes LBA number then FW, it would also need this exact group information before it can read out the Group.

However, if the group information ID (LBA ID) is lost or start location of the group is lost then there is no way to Descramble the Data in traditional methods, i.e. data is Lost.

In the embodiments disclosed, one does not need to know the Group ID information nor group start to descramble the data. For example, physical address information may be used. In some embodiments, temporal information like the program-erase cycle, which are also related to physical activity on that page/block, may also be used to scramble data. In some situations the program-erase cycle for a page/block may be lost. However, even where this occurs it may be recovered by a limited number of attempts to descramble the data using guesses for the program-erase cycle.

In particular, the process represented diagrammatically in FIG. 3A may be used to perform data randomization. As shown, a portion 300 of a nand flash device may be divided into a plurality of pages 302a-302d. The device itself, or some other separate device, may store a cycle count 304a-304d storing the number of write cycles that have been performed on a corresponding page 302a-302d. The data within a page may be stored at a plurality of column addresses 304a-306d. Accordingly, a data word may be uniquely addressed using an identifier of the page 302a-302d in which it is stored and the column address 306a-306d at which it is stored.

In embodiments described herein, a data word at an arbitrary page (302d in the illustrated example) and column address (306b in the illustrated example) may be randomized using a page identifier for the page 302d and a column address of the column 306b to which the data word is written. In some embodiments, all of the page identifier, column address, and cycle count 304d for the page 302d may be used to randomize the data word.

In particular, a randomization seed 308 may be generated based on some or all of the page identifier, cycle count, and column address. The seed and the data word 310 may be randomized to generate a randomized data word 312. Randomization may be performed according to any pseudo-randomization process known in the art (in prior approaches this usually means feedback loops where next data scrambled is dependent on previous data scrambled). In particular, randomization may be performed in a deterministic and reversible manner based on the seed. For example, a hash function may be performed based on the randomization seed 308 and input data word 310. The hash function preferably is such that a small difference (e.g. +/−1) in either of the seed 308 and input data word 310 will result in much more significant variation in the randomized data word 312.

Referring to FIG. 3B, de-randomization may be performed by reconstructing the randomization seed 308 based on the page identifier, column address, and cycle count for a given location and reversing the randomization process using the seed 308 and the randomized data word 312 to obtain the original input data word.

Figure 4:
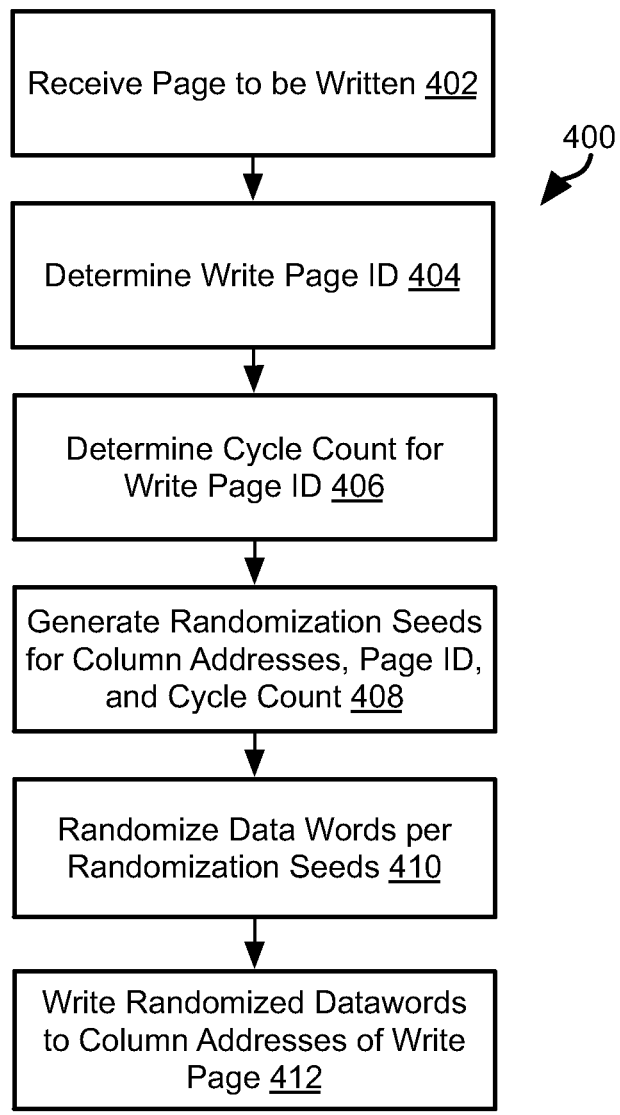
FIG. 4 is a process flow diagram of a randomization process in accordance with an embodiment of the invention.

FIG. 4 illustrates a method 400 for randomizing data words. The method 400 may advantageously by one or both of the nand interface 204, SSD controller 206, and host interface 208 such that the randomization and de-randomization does not require processing by a processor 102 (e.g. CPU or memory controller) of a host computing device.

The method 400 may include receiving 402 a page of data to be written. This may include receiving an instruction including a page identifier at which the page of data is to be written. As for other embodiments disclosed herein, a page may include 16 KB including 8 bit, 16 bit, 32 bit, or some other size of data words. The page may have other sizes, such as 32 KB, 64 KB, 128 KB, or some other size.

The method 400 may include determining 404 from the write instruction a page identifier and determining 406 a cycle count for the page identifier. The cycle count for a page identifier may be stored in a table of such values within the same medium as the physical page itself or in some other location or device. Randomization seeds may be generated 408 for each column address within a page. As described above, the randomization seed for a column address may be based on the page identifier, column address, and cycle count for the page identifier. The randomization seed may simply be a concatenation of these values or be a function of these values, e.g. a result of a hash function taking these values as inputs.

At step 410, input data words of the page to be written are randomized 410. In particular, for each data word in the page to be written, the data word may be randomized using the randomization seed corresponding to the column address to which that data word is to be written, e.g. an offset to the data word within the page.

The randomized data words may then be written 412 to the physical page corresponding to the page identifier. As described above, the physical process of writing and reading to the actual nand flash device is performed in pages. Accordingly, in some embodiments, the randomized data words may be generated and stored in a buffer. The contents of this buffer may then be written to the cells of the nand flash device. Alternatively, data words may be separately and sequentially processed according to steps 408-412. In some embodiments, the steps of generating 408 a seed and randomizing a data word may be performed with respect to each data word separately in sequence or may be performed for all data words in parallel.

Figure 5:
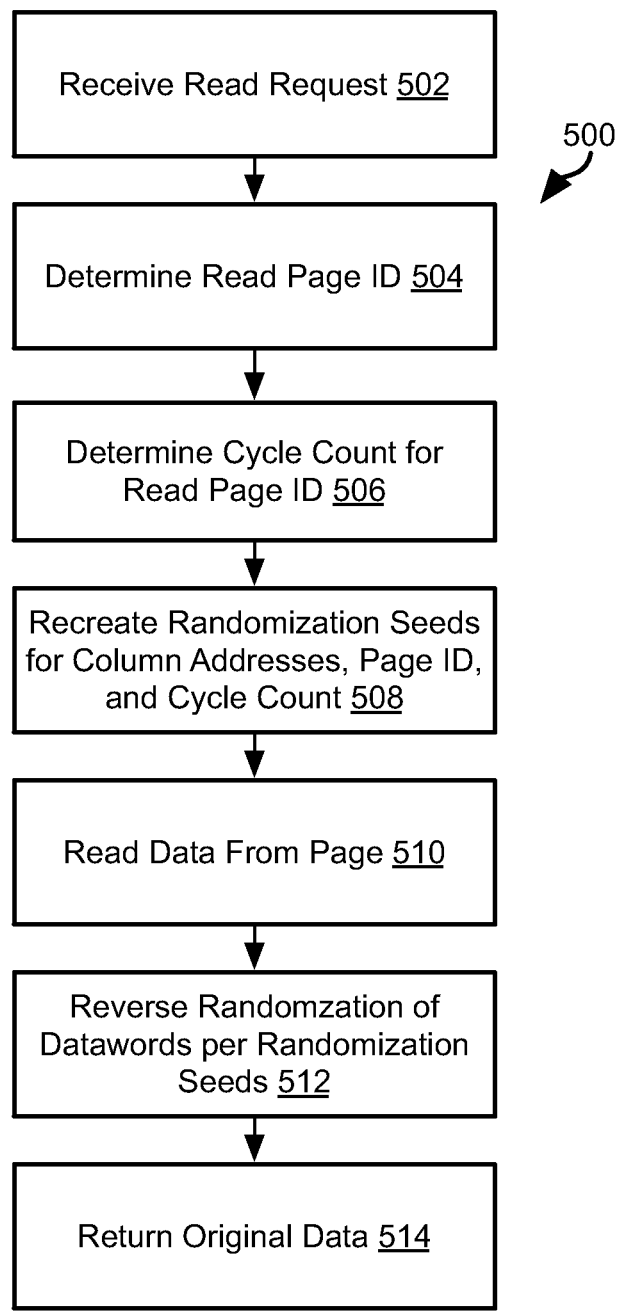
FIG. 5 is a process flow diagram of a de-randomization process in accordance with an embodiment of the invention.

Referring to FIG. 5, the process 500 of reading a page of randomized data words may be reverse of the process 400. The illustrated process 500 may be formed by the same or different components as the process 400.

The method 500 may include receiving 502 a read request, the read request referencing a page to be read from a nand flash device, such as by including a page identifier. The method 500 may include determining 504 the page identifier of the page to be read from the request and determining 506 the cycle count for the page identifier 506 in the same manner as for the method 400. The cycle count may only record the number of write cycles. Accordingly, the cycle count of the page identifier may not need to be adjusted in order to determine the cycle count used to scramble the data words written to the physical page corresponding to the page identifier.

The randomization seeds may be recreated 508 for the column addresses using the page identifier, cycle count, and column addresses in the same manner as for the method 400.

The randomized data words may be read 510 from the physical page referenced by the page identifier. The randomized words may then be de-randomized 512 by reversing the randomization process performed at step 410 of the method 400. In particular, the randomization seeds 508 and the read randomized data words may be input to a de-randomization algorithm that extracts the original data word. The de-randomization algorithm and corresponding randomization algorithm may be any de-randomization and randomization algorithm known in the art. If no feedback loop is used, then a simple hash and xor, e.g. hash (seed) xor (dataword), may be used as the de-randomization and randomization algorithms.

The original data words of the page obtained at step 512 may then be returned 514 to a device from which the read request was received 502. As for the method 400, the steps of recreating 508 the seeds, reading 510 the data, and reversing 512 randomization may be performed in parallel or sequentially, i.e. for each data word separately and in sequence.

The present invention may be embodied in other specific forms without departing from its spirit or essential characteristics. The described embodiments are to be considered in all respects only as illustrative, and not restrictive. In particular, although the methods are described with respect to a nand flash SSD, other SSD devices or non-volatile storage devices such as hard disk drives may also benefit from the methods disclosed herein. The scope of the invention is, therefore, indicated by the appended claims, rather than by the foregoing description. All changes which come within the meaning and range of equivalency of the claims are to be embraced within their scope.

What is claimed is:

1. A method for accessing a nand flash device defining a plurality of pages each having a plurality of column addresses, the method comprising:
    receiving a write request referencing a page identifier and including a plurality of data words to be written to a page corresponding to the page identifier, each data word of the plurality of data words corresponding to a column address within the page; and
    for each data word:
        randomizing the each data word according to a pseudo-randomization algorithm seeded by the column address corresponding to the each data word and the page identifier to obtain a randomized word; and
        writing the randomized word to the page at the column address corresponding to the each data word.

2. The method of claim 1, wherein the nand flash device further stores a plurality of cycle counts for each page of the plurality of pages, the method further comprising retrieving a cycle count of the plurality of cycle counts corresponding to the page identifier; and
    wherein randomizing the each data word further comprises randomizing the data word according to the pseudo-randomization algorithm seeded by the column address corresponding to the each data word, the page identifier, and the cycle count of the plurality of cycle counts corresponding to the page identifier.

3. The method of claim 2, further comprising:
    receiving a read request referencing the page identifier; and
    for each column address of the plurality of column addresses:
        reconstructing a seed according to the page identifier, the cycle count of the plurality of cycle counts corresponding to the page identifier, the each column address, and the cycle count of the plurality of cycle counts corresponding to the page identifier;
        reading the randomized word at the column address in the page corresponding to the page identifier;
        de-randomizing the randomized data word using the seed to obtain the data word; and
        outputting the data word.

4. The method of claim 1, further comprising:
    receiving a read request referencing the page identifier; and
    for each column address of the plurality of column addresses:
        reconstructing a seed according to the page identifier, the cycle count of the plurality of cycle counts corresponding to the page identifier, the each column address such that reconstruction of the seed is not dependent on stored information other than the cycle count and can be performed in the absence of the cycle count with a limited number of guesses;
reading the randomized word at the column address in the page corresponding to the page identifier;
de-randomizing the randomized data word using the seed to obtain the data word; and
outputting the data word.

5. The method of claim 1, wherein the plurality of data words are part of a logical block of data words, the method further comprising writing other logical blocks of data words having non-uniform lengths to the nand flash device.

6. The method of claim 1, wherein the nand flash device is a single-level cell device.

7. The method of claim 1, wherein the nand flash device is a multi-level cell device.

8. The method of claim 1, wherein the nand flash is a three-bit cell device.

9. The method of claim 1, wherein the nand flash is a t-bit cell device.

10. The method of claim 1, wherein randomizing the each data word according to the pseudo-randomization algorithm seeded by the column address corresponding to the each data word and the page identifier to obtain the randomized word comprises inputting the column address and page identifier to a hash function.

11. An apparatus comprising:
a host computing device including one or more processors;
a storage device including a non-volatile storage medium defining a plurality of pages each having a plurality of column addresses; and
a memory controller device operably coupled to the host computing device and the storage device, the memory controller device configured to:
receive a write request referencing a page identifier and including a plurality of data words to be written to a page corresponding to the page identifier, each data word of the plurality of data words corresponding to a column address within the page; and
for each data word:
randomize the each data word according to a pseudo-randomization algorithm seeded by the column address corresponding to the each data word and the page identifier to obtain a randomized word; and
write the randomized word to the page at the column address corresponding to the each data word.

12. The apparatus of claim 11, wherein the non-volatile storage medium stores a plurality of cycle counts for each page of the plurality of pages, the memory controller device configured to:
retrieve a cycle count of the plurality of cycle counts corresponding to the page identifier; and
randomize the each data word further by randomizing the data word according to the pseudo-randomization algorithm seeded by the column address corresponding to the each data word, the page identifier, and the cycle count of the plurality of cycle counts corresponding to the page identifier.

13. The apparatus of claim 12, wherein the memory controller device is further configured to:
receive a read request referencing the page identifier; and
for each column address of the plurality of column addresses:
reconstruct a seed according to the page identifier, the cycle count of the plurality of cycle counts corresponding to the page identifier, the each column address, and the cycle count of the plurality of cycle counts corresponding to the page identifier;
read the randomized word at the column address in the page corresponding to the page identifier;
de-randomize the randomized data word using the seed to obtain the data word; and
output the data word.

14. The apparatus of claim 11, wherein the memory controller device is further configured to:
receive a read request referencing the page identifier; and
for each column address of the plurality of column addresses:
reconstruct a seed according to the page identifier, the cycle count of the plurality of cycle counts corresponding to the page identifier, the each column address;
read the randomized word at the column address in the page corresponding to the page identifier;
de-randomize the randomized data word using the seed to obtain the data word; and
output the data word.

15. The apparatus of claim 11, wherein the plurality of data words are part of a logical block of data words, the memory controller device is further configured to write logical blocks of data words having non-uniform lengths to the storage device.

16. The apparatus of claim 11, wherein the storage device is a single-level nand cell device.

17. The apparatus of claim 11, wherein the storage device is a multi-bit nand cell device.

18. The apparatus of claim 11, wherein the storage device is a three-bit nand cell device.

19. The apparatus of claim 11, wherein the memory controller device is further configured to randomize the each data word according to the pseudo-randomization algorithm seeded by the column address corresponding to the each data word and the page identifier to obtain the randomized word by inputting the column address and page identifier to a hash function.

20. The apparatus of claim 11, the memory controller device is solid state drive controller.

* * * * *